United States Patent [19]
Oram

[11] 3,940,984
[45] Mar. 2, 1976

[54] MEANS FOR CONTROLLING THE DISPLACEMENT OF A UNIVERSALLY PIVOTED MEMBER

[75] Inventor: John Anderson Oram, Leighton Buzzard, England

[73] Assignee: Ferraris Development and Engineering Company Limited, London, England

[22] Filed: Nov. 14, 1973

[21] Appl. No.: 415,644

Related U.S. Application Data
[63] Continuation of Ser. No. 192,102, Oct. 26, 1971, abandoned.

[52] U.S. Cl. ............................................. 73/189
[51] Int. Cl.² .................. G01W 1/04; G01P 5/04
[58] Field of Search ............................ 73/189, 228

[56] References Cited
UNITED STATES PATENTS

| | | | |
|---|---|---|---|
| 2,098,099 | 11/1937 | Kahn | 73/189 |
| 2,125,365 | 8/1938 | Waller | 73/189 |
| 2,665,583 | 1/1954 | Anjanos | 73/189 |
| 2,780,937 | 2/1957 | Haynes et al. | 73/189 |
| 3,277,706 | 10/1966 | Godet | 73/189 |

FOREIGN PATENTS OR APPLICATIONS

| | | | |
|---|---|---|---|
| 1,194,187 | 6/1970 | United Kingdom | 73/189 |
| 1,003,006 | 9/1965 | United Kingdom | 73/189 |

*Primary Examiner*—Richard C. Queisser
*Assistant Examiner*—John S. Appleman
*Attorney, Agent, or Firm*—Edwin E. Greigg

[57] ABSTRACT

The invention provides means for controlling the displacement of a universally pivoted member which is subject to a force, such as the force of the wind tending to move the member about its universal pivot, so that a predetermined law of displacement in relation to the applied force is maintained.

6 Claims, 6 Drawing Figures

Fig1

MEANS FOR CONTROLLING THE DISPLACEMENT OF A UNIVERSALLY PIVOTED MEMBER

This is a continuation of application Ser. No. 192,102, filed Oct. 26, 1971 abandoned.

BACKGROUND OF THE INVENTION

This invention relates to means for controlling the displacement of a universally pivoted member which is subjected to a force tending to move the member about its pivot, so that a predetermined law of displacement in relation to the applied force is maintained.

For example, the invention may be applied to apparatus for providing an indication of the direction and/or speed of the wind consisting of a measuring unit comprising a universally pivoted member exposed to the wind so as to be displaced about its pivot by the force thereof and means for transmitting forces created by its displacement to a second universally pivoted member serving as an index or a display unit.

It has been proposed to provide apparatus for providing an indication of one or both of two parameters of wind flow, namely wind direction and wind speed, in which the measuring unit comprises a member to be exposed to the wind for offering a resistance to the force exxerted on it by the wind, which resistance acts at all times in a direction opposed to the direction of the wind. The member is mounted for universal pivotal movement, and its angular displacement about the universal pivot actuates sensing elements capable of producing signals in accordance with the direction and magnitude of the angular displacement. At least one display unit is provided, operated by the signals produced by the sensing element, to show the value of at least one of the parameters. Such apparatus will be hereinafter called "wind indicating apparatus of the kind referred to."

OBJECTS AND SUMMARY OF THE INVENTION

It is the main object of the present invention to provide means for controlling the displacement of a pivoted member such as is used to provide the wind-exposed member or the index of such apparatus, or for other similar purposes.

This, and well as other objects, are accomplished according to the present invention, wherein is provided means for creating a restoring force opposing angular displacement of a universally pivoted member in all directions about its universal pivot from a central position, wherein the universally pivoted member is elongated and extends in opposite directions from the universal pivot, and wherein a tension member has a first end thereof coupled to one end of the universally pivoted member so as to be constrained to move about the universal pivot with angular displacement of the universally pivoted member, and extending from the one end away from the universal pivot to a position at which a second end thereof is held against angular movement about the universal pivot. The tension member includes or is acted on by resilient means, the arrangement being such that the universal pivot and the first and second ends of the tension member are in a straight line when the universally pivoted member is in its central position so that displacement of the universally pivoted member in any direction from its central position stresses the resilient means to provide at least a part of the restoring force on the universally pivoted member.

The universal pivot for the universally pivoted member is preferably provided by an annular bushing or diaphragm of flexible and resilient material the outer periphery of which is located with respect to a fixed mounting whilst the inner periphery thereof is engaged by the universally pivoted member, so that angular movement of the universally pivoted member distorts the bushing or diaphragm and thereby creates at least a part of the restoring force on the pivoted member.

The tension member may be mounted between the universally pivoted member and a fixed anchorage point. The arrangement is such that the pivot of the universally pivoted member and the fixed anchorage are on opposite sides of the connection of the tension member to the universally pivoted member, and are in line with one another and with the connection when the universally pivoted member is in the central position.

Further, according to the invention, a device for indicating wind speed, wind direction, or both wind speed and wind direction comprises a measuring unit and a display unit each comprising an assembly according to one of the last three preceding paragraphs, the universally pivoted member of the measuring unit including a member exposed to the wind and the universally pivoted member of the display unit constituting an index co-operating with a scale of wind speed, a scale of wind direction, or scales of both wind speed and wind direction, and means being provided for effecting displacements of the index determined in magnitude and direction by the displacements of the universally pivoted member of the measuring unit.

BRIEF DESCRIPTION OF THE DRAWINGS

The invention will now be described with reference to the accompanying drawings which show, by way of example, two embodiments of the invention applied respectively to a measuring unit and to a display unit of an apparatus for providing an indication of the direction and speed of the wind.

In the drawings.

DESCRIPTION OF THE PREFERRED EMBODIMENTS

Figure 1:
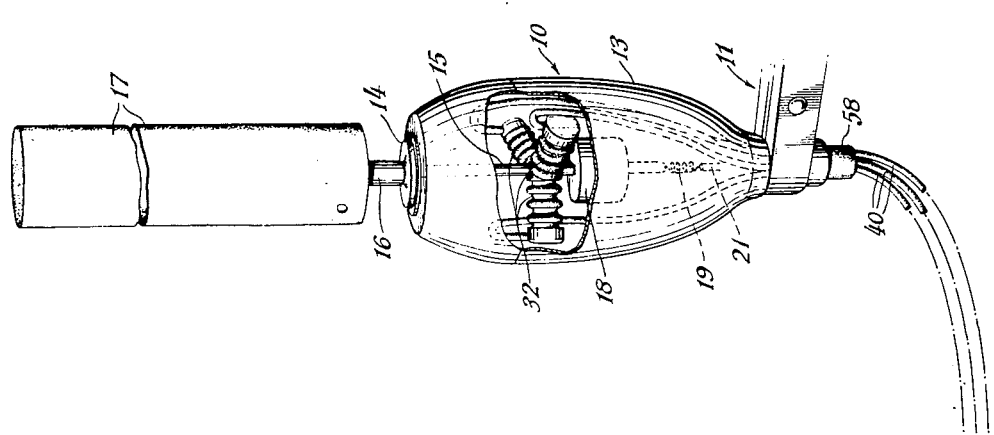
FIG. 1 is a perspective view of both the measuring unit and the display unit of such an apparatus, part of the casing of the measuring unit being broken away.
Figure 1:
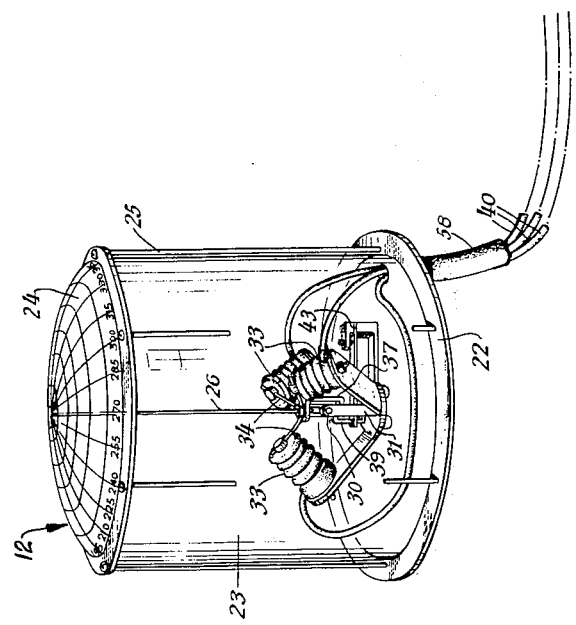
Figure 5:
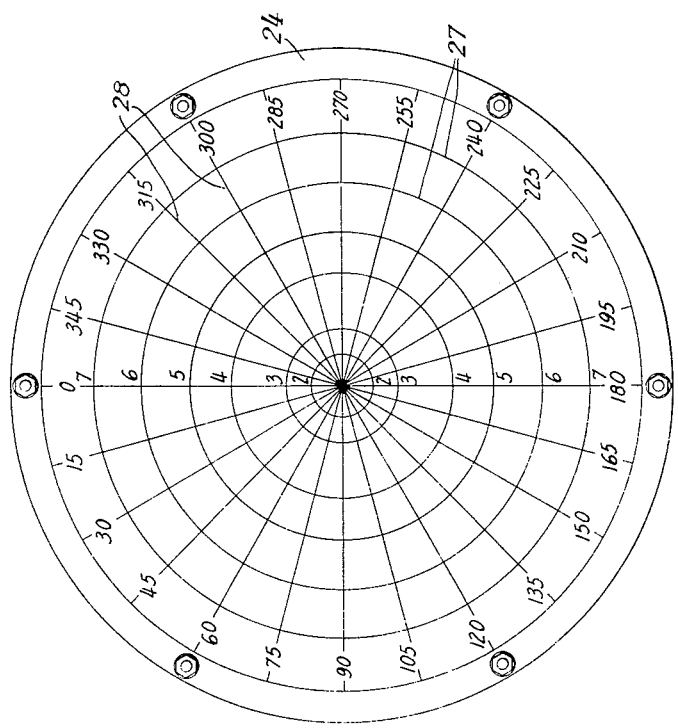
FIG. 5 is a plan view of the display unit.

Referring to FIG. 1 of the drawings, the apparatus consists of a measuring unit 10 adapted for mounting, for example by means of a bracket 11, in a position exposed to the wind, and a display unit 12 adapted to be mounted in a position remote from the measuring unit 10 and connected thereto as will be hereinafter described.

The measuring unit comprises an elongated hollow casing 13, conveniently formed of metal and circular in cross-section, the casing 13, as shown, being mounted with its axis vertical. At its upper end the casing 13 has a circular opening in which is mounted a flexible support 14 for a rod 15 the upper end of which has fixed on it a member to be exposed to the wind, the force and direction of which are to be measured. The member may, as shown in the drawings, be a hollow cylindrical member 17 carried by a sleeve 16 fixed on the rod 15. The flexible support 14 comprises a bushing 14A (FIG. 2) of elastomeric material bonded at its inner periphery to a metal sleeve 14b which fits closely on the rod 15 and is clamped at its outer edge between the two metal plates 14c by means of which it is secured to the casing 13. The rod 15 carries, inside the casing 13, a counterweight 18 and is connected at its lower end by a tension member in the form of a coiled tension spring 19 to an anchorage 21 fixed in the casing, the anchorage being in such a position that it lies on the axis of the rod 15 when the latter is in a central position.

The rod 15, sleeve member 16, hollow cylindrical member 17 and counterwieght 18 together constitute a universally pivoted member.

The display unit 12 comprises a base plate 22, a cylindrical wall 23, and a domed upper transparent wall 24. The cylindrical wall 23 is clamped between the base plate 22 and the edge of the domed upper wall 24, for example by rods 25 having screw-threaded ends passing through holes in the base plate and the upper wall, and nuts screwed on to the rods.

A pointer 26, mounted for universal pivotal movement about a point on the vertical axis of the cylindrical wall 23, co-operates with markings on the domed upper transparent wall 24. Such markings include concentric circles 27 to provide a scale of wind speed and radial lines 28 to provide a scale of wind direction. The pointer 26 is supported by a pointed bearing member 29 (FIG. 6) engaging in a locating cavity in a rod 30 carried by a bracket 31 fixed to the main base plate 22.

Figure 2:
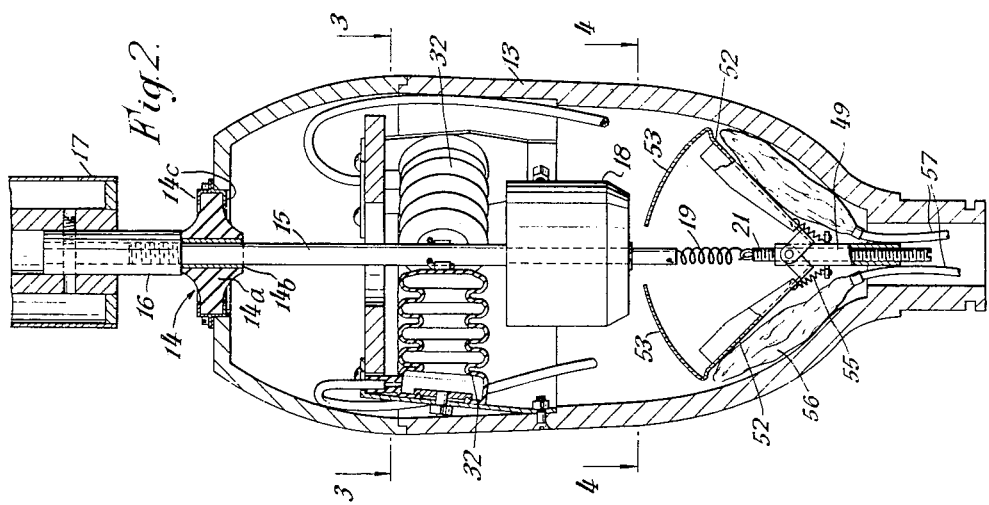
FIG. 2 is a sectional elevation; on a larger scale, of the measuring unit.
Figure 3:
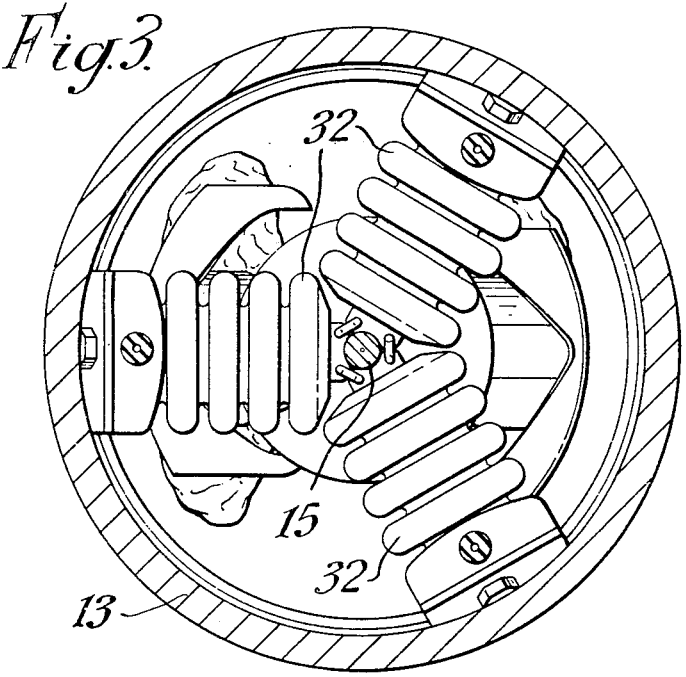
FIG. 3 is a section on the line 3—3 of FIG. 2.

Displacement of the rod 15 from its central position by wind pressure acting on the hollow cylindrical member 17 is detected by sensing elements in the casing 13 which transmit signals to corresponding slave elements in the display unit 12 to move the pointer 26. Any combination of sensing and slave elements capable of deflecting the pointer 26 in a direction bearing always the same relation to the direction of displacement of the member 17 and to an extent which depends on the angle of displacement of the member 17 may be used. As an example of a suitable arrangement, there are provided in the measuring unit 10 three flexible bellows 32 (FIGS. 1,2 and 3) with their axes radiating at equal angular intervals from the rod 15, the outer ends of the bellows 32 being held in fixed positions in the casing 13, for example as shown in FIGS. 2 and 3; and their inner ends being coupled to the rod 15. Similar bellows 33 are mounted in the display unit 12, as shown in FIGS. 1 and 6, with their axes inclined to the plane of the base plate 22 between arms forming parts of the bracket 31 and arms 34 radiating from a collar 35 fixed to the pointer 26.

Each bellows 32 is connected by a flexible tube 40 to one of the bellows 33. The bellows and tubes are filled with air so that any change in volume of a bellows 32 due to displacement of the rod 15 results in a related change in volume of the bellows 33 connected thereto.

Figure 6:
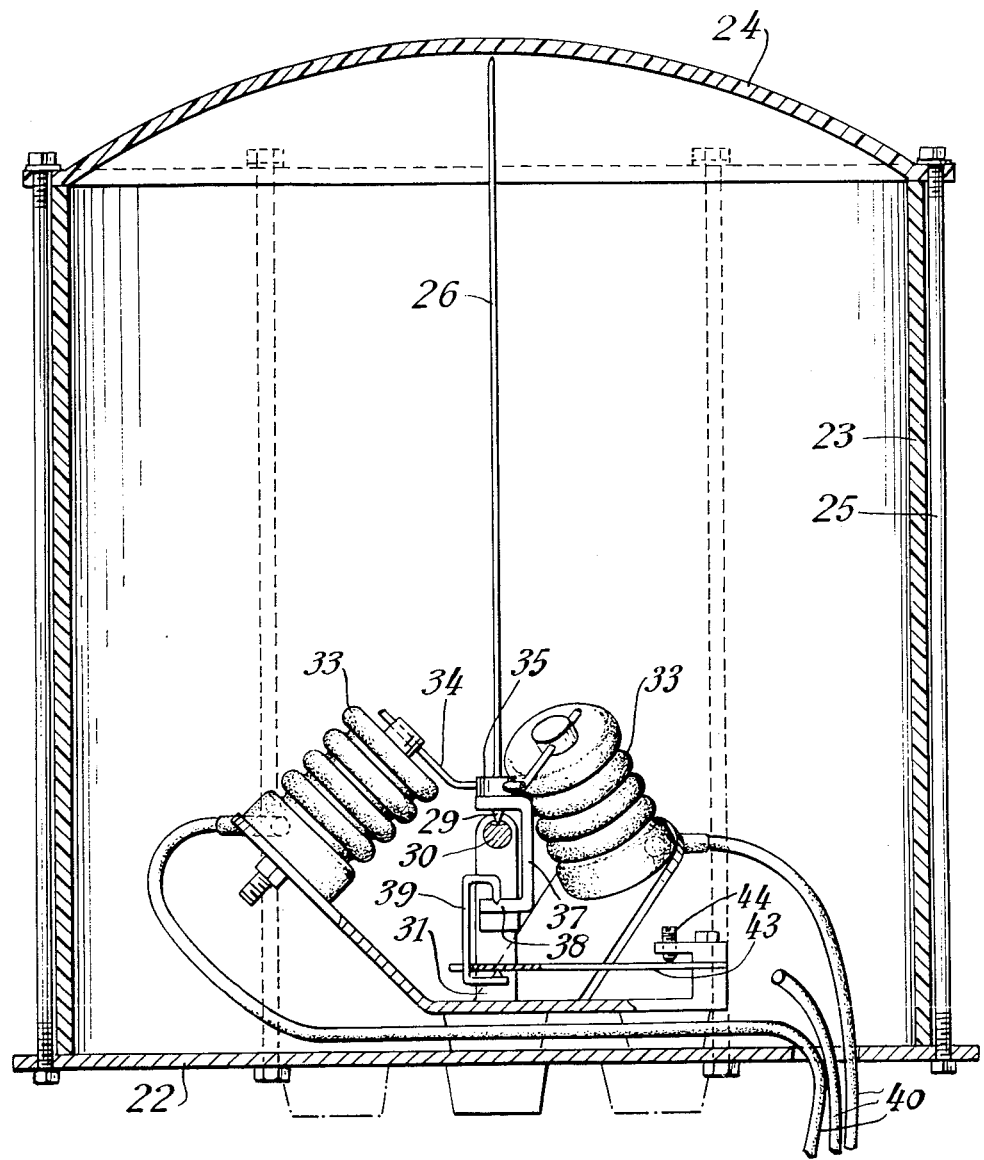
FIG. 6 is a sectional elevation of the display unit shown in FIG. 5.

As shown in FIG. 6, the pointer 26 includes, at its end adjacent its pivot a component 37 having a limb 38 which lies in a plane perpendicular to the pointer axis at the opposite side of the pivot to the domed casing wall 24. A tension link 39, shaped as shown in FIG. 6 has pointed ends engaging respectively in locating pits in the limb 38 and in a blade spring 43 fixed to the bracket 31 so as to extend radially of the base plate 22. The blade spring 43 exerts a downward force on the tension link 39 which increases as the pointer 26 is deflected from its central position, thus providing a restoring force acting on the pointer. Adjustment of the tension exerted by the spring 43 is provided by a setscrew 44 mounted in the bracket 31 and bearing on the spring.

It is well known that a force exerted on a rigid body, such as the hollow cylindrical member 17, by a fluid moving relative to the body, is substantially proportional to the square of the speed of the fluid, so that if the angular displacement of the member 17 had a linear relationship with the force exerted, and the pointer 26 moved to the same extent as the member 17, the movement of the pointer 26 for equal increments of wind speed when the wind speed was low and when the wind speed was high would be considerably different, and the circular lines 27 on the transparent upper wall 24 would be cramped together at the center of the wall and unduly widely spaced towards the edge of the upper wall.

It is thus desirable to modify the relation between the wind force acting on the hollow cylindrical member 17 and movement of the pointer 26, so that movement of the latter for a given change in wind force decreases as the hollow cylindrical member 17 is displaced from its central position.

The provision of a tension member which is itself resilient or which acts on resilient means to apply an increasing load thereto as the rod 15 or pointer 26 moves from a central position introduces resistance to angular displacement of the rod 15 or the pointer 26, which resistance can be made to vary with the angular displacement in any desired manner.

The use of an elastomeric bushing or diaphragm, which is distorted by angular movement of the rod 15 also introduces a resistance to angular displacement which can be made to vary with the displacement in any desired manner.

Thus, because of the action of the tension member 19 and the bushing 14, the displacement of the hollow cylindrical member 17 increases with wind speed at a rate less than the square of the wind speed and, because of the action of the means for providing a restoring force on the pointer 26, that pointer, for a given signal from the measuring unit, moves through an angle relative to the angular movement of the cylindrical member 17 which decreases as the angle of movement of the member 17 increases. The movement of the pointer 26 can therefore be brought into a relationship to the actual wind speed which approaches a linear relationship, so that the wind speed scale markings on the wall 24 can have a spacing which does not vary greatly from one end of the scale to the other.

To enable the initial loading of the tension spring 19 to be adjusted, the anchorage member 21 may be in the form of a screw-threaded rod mounted in a screw-threaded tube 49 suitably fixed in position in the casing 13. The tension member, instead of being in the form of a coiled spring or other resilient member, may comprise a substantially non-extensible thread, wire or filament. Angular displacement of the hollow tubular member 17, and resulting angular displacement of the tension member, create tension in the tension member. If the tension member is itself resilient, a restoring force is produced both by the stretching of the member and by the axial distortion of the elastomeric bushing due to the increased tension applied thereto, but if the tension member is substantially inextensible the restoring force is produced wholly by axial distortion of the elastomeric bushing 14. The restoring force in both cases varies with the angular displacement.

It will be appreciated that, when the apparatus is erected, the hollow cylindrical member 17 and the pointer 26 must be so relatively positioned that when the member 17 is in its central position the pointer 26 is also in its central position. Since it is convenient to connect the bellows 32 to the bellows 33 after the measuring unit has been erected and is exposed to any wind which may be blowing, means are preferably provided for holding the hollow cylindrical member in its central position whilst the connections between the bellows are made by coupling up the tubes 40.

Figure 4:
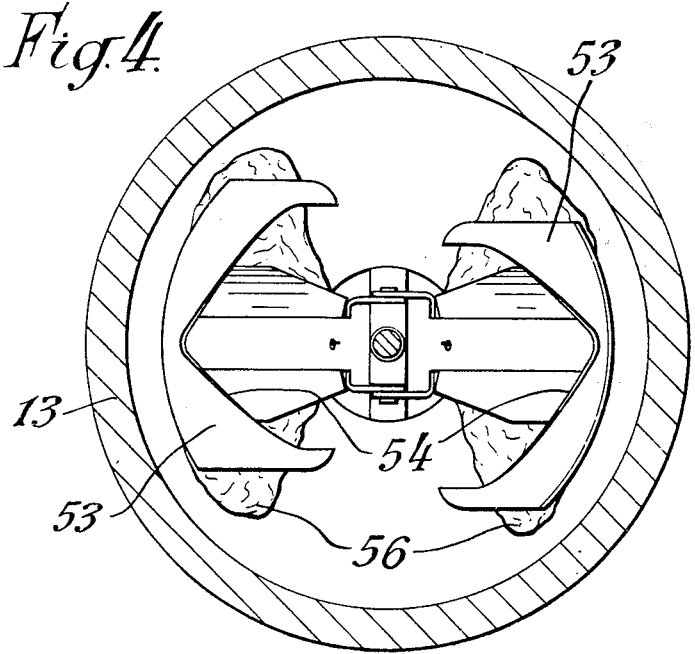
FIG. 4 is a section on the line 4—4 of FIG. 2.

As shown in FIGS. 2 and 4 of the drawings, these holding means comprise two jaw members 52 pivoted on the tube 49 and having arcuate portions 53 each comprising two limbs defining between them a substantially V-shaped notch 54, the jaw members being acted on by springs 55 which hold them normally in spaced-apart positions as shown in FIGS. 2 and 4 and means being provided to pivot them towards each other so that the arcuate portions 53 overlap one another and the lower end of the rod 15 is led into the apices of both notches 54. When the rod 15 lies in the apices of the two notches, the limbs of the arcuate portions 53 engage at their outer end with the internal surface of the casing 13, thus centering the rod 15 and the hollow tubular member 17. The jaw members 52 may be urged towards each other by forcing air into inflatable bags 56 placed each between one jaw member 52 and the wall of the casing 13, pipes 57 leading into the bags 56 being connected to a squeezable bulb or other means of forcing air through the pipes 57, which bulb or other means may be located adjacent the display unit 12.

The sensing elements (bellows 32) of the measuring unit 10, and the slave elements (bellows 33) of the display unit 12 are of course, affected by ambient pressure and temperature, changes in which will cause changes in the air pressure in the bellows. In the arrangement described above, provided that the ambient conditions affecting the three bellows 32 are the same, the ambient conditions affecting the three bellows 33 are the same and the ambient conditions affecting the three connecting tubes are the same, even if the ambient conditions affecting these three sections of the system are different, the system as a whole is self-compensating. Usually the ambient conditions affecting each section of the system will be at least substantially uniform, but, to reduce the risk of any lack of uniformity, the casings 13 and 22, 23, 24 may be sealed and connected by a tube so that the internal pressures therein are equalised. As a further precaution the connecting tubes 40 may pass through a sealed conduit, the ends of which are shown at 58 in FIG. 1, such conduit conveniently serving as the connecting tube between the two casings.

The pointer 26 may be replaced by a light beam, the diaphragm previously referred to as supporting the pointer carrying a light source or a mirror reflecting light from a fixed source.

I claim:

1. A device for indicating at least one of two wind characteristics, namely, wind speed and wind direction and comprising: a measuring unit having an elongated universally pivoted member comprising a rod, a counterweight supported by a first end of the rod, and an elongate member supported by a second end of the rod, the elongate member being adapted to be exposed to the wind; a display unit having an elongated universally pivoted member which serves as an index, and a scale of at least one of wind direction and wind speed, a plurality of transmitting bellows coupled to said universally pivoted member of the measuring unit in different angular positions, an equal number of slave bellows coupled to said index at similar angular positions and pipe means connecting each transmitting bellows to a slave bellows so that distortion of said transmitting bellows caused by angular movement of the universally pivoted member of said measuring unit when the elongate member thereof is acted upon by a wind load causes distortion of said slave bellows to effect displacement of the index relative to the scale; and wherein at least one of said units further includes an annular member of flexible and resilient material having an outer periphery and an inner periphery and constituting a universal pivot for said universally pivoted member, with said first and second ends of said universally pivoted member being on opposite sides of said pivot; a tension member; means coupling a first end of said tension member to the first end of said universally pivoted member; an anchorage means for the second end of said tension member holding said second end of said tension member against movement about said universal pivot, said second end of said tension member being more remote from said universal pivot member than the first end thereof, resilient means exerting a tension force on said tension member; adjustment means connected to said anchorage means for adjusting the force exerted by said tension member on said universally pivoted member; means for temporarily holding said universally pivoted member of said measuring unit in a central position; a fixed mounting for said annular member; and means locating the outer periphery of said annular member with respect to said fixed mounting, with said inner periphery of said annular member engaging said universally pivoted member; the arrangement being such that the universal pivot and the first and second ends of said tension member are in a straight line when the universally pivoted member is in a central position and angular movement of said universally pivoted member in any direction from said central position due to a wind load upon said elongate member of the universally pivoted member of the measuring unit stresses said resilient member to provide a first restoring force and distorts said annular member to thereby create a second restoring force which together with said first restoring force acts on said universally pivoted member to tend to restore it to its central position.

2. A device according to claim 1, wherein said transmitting bellows are enclosed in a sealed casing and said slave bellows are also enclosed in a sealed casing, the two casings being connected by a tube.

3. A device according to claim 1, wherein said transmitting bellows are enclosed in a sealed casing and said slave bellows are also enclosed in a sealed casing, the two casings being connected by a tube, said tube being a sealed conduit enclosing said pipe means connecting the respective transmitting bellows to said slave bellows.

4. A device for indicating at least one of two wind characteristics, namely, wind speed and wind direction and comprising: a measuring unit having an elongated universally pivoted member comprising a rod, a counterweight supported by a first end of the rod and an elongate member supported by a second end of the rod, the elongate member being adapted to be exposed to the wind; a display unit having an elongated universally pivoted member which serves as an index, and a scale of at least one of wind direction and wind speed; a plurality of transmitting bellows coupled to said universally pivoted member of the measuring unit in different angular positions, an equal number of slave bellows coupled to said index at similar angular positions and pipe means connecting each transmitting bellows to a slave bellows so that distortion of said transmitting bellows caused by angular movement of the universally pivoted member of said measuring unit when the elongate member thereof is acted upon by a wind load causes distortion of said slave bellows to effect displacement of the index relative to the scale; and wherein each of said measuring unit and said display unit includes an annular member of flexible and resilient material having an outer periphery and an inner periphery and constituting a universal pivot for said universally pivoted member, with said first and second ends of said universally pivoted member being on opposite sides of said pivot; a tension member; means coupling a first end of said tension member to the first end of said universally pivoted member; an anchorage means for the second end of said tension member holding said second end of said tension member against movement about said universal pivot, said second end of said tension member being more remote from said universal pivot member than the first end thereof, resilient means exerting a tension force on said tension member; adjustment means connected to said anchorage means for adjusting the force exerted by said tension member on said universally pivoted member; means for temporarily holding said universally pivoted member of said measuring unit in a central position; a fixed mounting for said annular member; and means locating the outer periphery of said annular member with respect to said fixed mounting, with said inner periphery of said annular member engaging said universally pivoted member; the arrangement being such that the universal pivot and the first and second ends of said tension member are in a straight line when the universally pivoted member is in a central position and angular movement of said universally pivoted member in any direction from said central position due to a wind load upon said elongate member of the universally pivoted member of the measuring unit stresses said resilient member to provide a first restoring force and distorts said annular member to thereby create a second restoring force which together with said first restoring force acts on said universally pivoted member to tend to restore it to its central position.

5. A device according to claim 4, wherein said transmitting bellows are enclosed in a sealed casing and said slave bellows are also enclosed in a sealed casing, the two casings being connected by a tube.

6. A device according to claim 4, wherein said transmitting bellows are enclosed in a sealed casing and said slave bellows are also enclosed in a sealed casing, the two casings being connected by a tube, said tube being a sealed conduit enclosing said pipe means connecting the respective transmitting bellows to said slave bellows.

* * * * *